(12) United States Patent
Bauters et al.

(10) Patent No.: US 9,880,353 B2
(45) Date of Patent: Jan. 30, 2018

(54) PHASE TUNING IN WAVEGUIDE ARRAYS

(71) Applicant: Aurrion, Inc., Goleta, CA (US)

(72) Inventors: Jared Bauters, Santa Barbara, CA (US); Brian R. Koch, Brisbane, CA (US); Jonathan Edgar Roth, San Francisco, CA (US); Gregory Alan Fish, Santa Barbara, CA (US)

(73) Assignee: Aurrion, Inc., Goleta, CA (US)

( * ) Notice: Subject to any disclaimer, the term of this patent is extended or adjusted under 35 U.S.C. 154(b) by 0 days.

(21) Appl. No.: 15/148,862

(22) Filed: May 6, 2016

(65) Prior Publication Data

US 2017/0023736 A1    Jan. 26, 2017

Related U.S. Application Data

(60) Provisional application No. 62/196,437, filed on Jul. 24, 2015.

(51) Int. Cl.
  *G02B 6/12* (2006.01)
  *G02B 6/136* (2006.01)
(52) U.S. Cl.
  CPC ..... *G02B 6/12033* (2013.01); *G02B 6/12026* (2013.01); *G02B 6/136* (2013.01)
(58) Field of Classification Search
  CPC ............ G02B 6/12009; G02B 6/12011; G02B 6/12014; G02B 6/12016; G02B 6/12019; G02B 6/12021; G02B 6/12026
  See application file for complete search history.

(56) References Cited

U.S. PATENT DOCUMENTS

| | | | |
|---|---|---|---|
| 3,308,394 | A | 3/1967 | Snitzer |
| 5,159,699 | A | 10/1992 | De Monts |
| 5,617,234 | A | 4/1997 | Koga et al. |
| 5,701,371 | A | 12/1997 | Ishida |
| 6,289,147 | B1 | 9/2001 | Bulthuis et al. |
| 6,421,478 | B1 | 7/2002 | Paiam |
| 6,434,292 | B1 | 8/2002 | Kim et al. |
| 6,466,707 | B1 | 10/2002 | Dawes et al. |
| 6,574,409 | B1 | 6/2003 | Moroni et al. |
| 6,574,413 | B1 | 6/2003 | Dieckroger Jens |
| 6,853,773 | B2 | 2/2005 | Lin |
| 6,870,992 | B2 | 3/2005 | Grosjean et al. |

(Continued)

FOREIGN PATENT DOCUMENTS

| | | |
|---|---|---|
| EP | 1628150 A1 | 2/2006 |
| EP | 2302429 A1 | 3/2011 |

(Continued)

OTHER PUBLICATIONS

"U.S. Appl. No. 13/751,492, Examiner Interview Summary dated Mar. 24, 2015", 3 pgs.

(Continued)

*Primary Examiner* — John M Bedtelyon
(74) *Attorney, Agent, or Firm* — Schwegman Lundberg & Woessner, P.A.

(57) ABSTRACT

The wavelength response of an arrayed waveguide grating can be tuned, in accordance with various embodiments, using a beam sweeper including one or more heaters to shift a lateral position of light focused by the beam sweeper at an interface of the beam sweeper with an input free propagation region of the arrayed waveguide grating.

26 Claims, 9 Drawing Sheets

(56) References Cited

U.S. PATENT DOCUMENTS

| | | |
|---|---|---|
| 6,978,056 B2 | 12/2005 | Tavlykaev |
| 6,987,913 B2 | 1/2006 | Blauvelt et al. |
| 7,050,681 B2 | 5/2006 | Blauvelt et al. |
| 7,095,920 B1 | 8/2006 | Little |
| 7,343,066 B2 | 3/2008 | Doerr et al. |
| 8,207,509 B2 | 6/2012 | Lundquist et al. |
| 8,369,666 B2 | 2/2013 | Kamei et al. |
| 8,805,187 B2 | 8/2014 | Mcgreer |
| 9,207,399 B2 | 12/2015 | Roth et al. |
| 9,684,190 B1 | 6/2017 | Roth et al. |
| 2001/0028769 A1 | 10/2001 | Deacon |
| 2002/0126933 A1 | 9/2002 | Goh et al. |
| 2002/0181857 A1 | 12/2002 | Komatsu et al. |
| 2003/0035609 A1 | 2/2003 | Hatanaka |
| 2003/0039461 A1 | 2/2003 | How Kee et al. |
| 2003/0048970 A1 | 3/2003 | Cole et al. |
| 2003/0123799 A1 | 7/2003 | Lazaro Villa |
| 2003/0210845 A1 | 11/2003 | Shani et al. |
| 2003/0223694 A1 | 12/2003 | Nikonov et al. |
| 2004/0028367 A1* | 2/2004 | Nara ............... G02B 6/12011 385/130 |
| 2004/0136647 A1 | 7/2004 | Mizuno et al. |
| 2005/0002594 A1 | 1/2005 | Parker et al. |
| 2005/0111778 A1 | 5/2005 | Takahashi |
| 2006/0051010 A1 | 3/2006 | Chu et al. |
| 2006/0098910 A1 | 5/2006 | Bintz et al. |
| 2007/0086719 A1 | 4/2007 | Takahashi et al. |
| 2009/0087138 A1* | 4/2009 | Yan ............... G02B 6/12026 385/14 |
| 2009/0245316 A1 | 10/2009 | Sysak et al. |
| 2010/0111533 A1 | 5/2010 | Beckett et al. |
| 2011/0110624 A1 | 5/2011 | Kamei et al. |
| 2012/0002918 A1 | 1/2012 | Kawashima et al. |
| 2012/0057816 A1 | 3/2012 | Krasulick et al. |
| 2012/0251029 A1 | 10/2012 | Kobrinsky et al. |
| 2013/0108204 A1 | 5/2013 | Takabayashi et al. |
| 2014/0079082 A1 | 3/2014 | Feng et al. |
| 2014/0212092 A1 | 7/2014 | Roth et al. |
| 2014/0328591 A1 | 11/2014 | Koch et al. |
| 2015/0124845 A1 | 5/2015 | Koch et al. |
| 2015/0192803 A1 | 7/2015 | Lee et al. |
| 2016/0173221 A1* | 6/2016 | Kato ............... H04J 14/02 398/79 |

FOREIGN PATENT DOCUMENTS

| | | | |
|---|---|---|---|
| EP | 2463694 A1 | | 6/2012 |
| EP | 2871504 A1 | | 5/2015 |
| JP | 2000249993 A | * | 9/2000 |
| JP | 2010175645 A | | 8/2010 |
| WO | WO-03042734 A2 | | 5/2003 |
| WO | WO-2017019145 A1 | | 2/2017 |

OTHER PUBLICATIONS

"U.S. Appl. No. 13/751,492, Final Office Action dated Apr. 15, 2015", 8 pgs.

"U.S. Appl. No. 13/751,492, Non Final Office Action dated Nov. 18, 2014", 11 pgs.

"U.S. Appl. No. 13/751,492, Notice of Allowance dated Aug. 26, 2015", 5 pgs.

"U.S. Appl. No. 13/751,492, Response filed Aug. 13, 2015 to Final Office Action dated Apr. 15, 2015", 6 pgs.

"U.S. Appl. No. 13/751,492, Response fled Mar. 18, 2015 to Non Final Office Action dated Nov. 18, 2014", 13 pgs.

"U.S. Appl. No. 13/899,336, Non Final Office Action dated May 5, 2014", 11 pgs.

"U.S. Appl. No. 14/073,687, Non Final Office Action dated Jan. 4, 2016", 16 pgs.

"U.S. Appl. No. 14/929,603, Preliminary Amendment filed Dec. 28, 2015", 7 pgs.

"APSS Apollo application note on array waveguide grating (AWG)", [Online] retrieved from the internet: (www.apollophotonics.com), (Aug. 13, 2012), 1-24.

"European Application Serial No. 14000807.9, Extended European Search Report dated Jun. 16, 2014", 6 pgs.

"European Application Serial No. 14003719.3, Noting of Loss of Rights dated Dec. 23, 2015", 1 pg.

"European Patent Office Application Serial No. 14003719.3, Extended European Search Report dated Mar. 11, 2015", 3 Pages.

Dieckroger, J, et al., "Thermooptically Tunable Optical Phased Array in SiO—Si", IEEE Photonics Technology Letters, 11(2), (Feb. 1999), 248-250.

Ding, et al., "Fabrication tolerant polarization splitter and rotator based on a tapered directional coupler", Optical Society of America, vol. 20, (Aug. 27, 2012), 7 pgs.

Fan, et al., "High Directivity, Vertical Fiber-to-Chip Coupler with Anisotropically Radiating Grating Teeth", Optical Society of America, (2007), 2 pgs.

Ishii, et al., "SMT-Compatible Optical-I/O Chip Packaging for Chip-Level Optical Interconnects", IEEE, 2001 Electronic Components and Technology Conference, (2001), 6 pgs.

Little, Brent E, et al., "Design Rules for Maximally Flat Wavelength-Insensitive Optical Power Dividers Using Mach-Zehnder Structures", IEEE PhotonicsTechnology Letters vol. 9, (Dec. 12, 1997).

Liu, et al., "Silicon-on-insulator polarization splitting and rotating device for polarization diversity circuits", Optical Society of America, vol. 19, (Jun. 20, 2011), 6 pgs.

Vermeulen, et al., "High-efficiency fiber-to-chip grating couplers realized using an advanced CMOS-compatible Silicon-On-Insulator platform", Optical Society of America, vol. 18, (Aug. 16, 2010), 6 pgs.

Yang, Yan, et al., "Thermo-Optically Tunable Silicon AWG With Above 600 GHz Channel Tunability", IEEE Photonics Technology Letters, 27(22), (Nov. 15, 2015), 2351-2354.

"International Application Serial No. PCT/US2016/031316, International Search Report dated Sep. 19, 2016", 5 pgs.

"International Application Serial No. PCT/US2016/031316, Invitation to Pay Additional Fees and Partial Search Report dated Jun. 30, 2016", 2 pgs.

"International Application Serial No. PCT/US2016/031316, Response filed Jul. 28, 2016 to Partial Search Report dated Jun. 30, 2016", 1 pg.

"International Application Serial No. PCT/US2016/031316, Written Opinion dated Sep. 19, 2016", 15 pgs.

Doerr, et al., "Wide Bandwidth Silicon Nitride Grating Coupler", IEEE Photonics Technology Letters vol. 22, (Oct. 1, 2010), 1461-1463.

"U.S. Appl. No. 14/929,603, Final Office Action dated Jan. 23, 2017", 14 pgs.

"U.S. Appl. No. 14/929,603, Non Final Office Action dated Nov. 1, 2016", 13 pgs.

"U.S. Appl. No. 14/929,603, Notice of Allowance dated Mar. 31, 2017", 5 pgs.

"U.S. Appl. No. 14/929,603, Response filed Jan. 6, 2016 to Non Final Office Action dated Nov. 1, 2016", 13 pgs.

"U.S. Appl. No. 14/929,603, Response filed Mar. 20, 2017 to Final Office Action dated Jan. 23, 2017", 6 pgs.

U.S. Appl. No. 14/073,687, filed Nov. 6, 2013, Optical Mode Steering for Wavelength Stabilization.

U.S. Appl. No. 13/751,492, filed Jan. 28, 2013, Athermal Optical Filter With Active Tuning and Simplified Control.

U.S. Appl. No. 14/929,603, filed Nov. 2, 2015, Athermal Optical Filter With Active Tuning and Simplified Control.

\* cited by examiner

PHASE TUNING IN WAVEGUIDE ARRAYS

CROSS-REFERENCE TO RELATED APPLICATIONS

This application claims priority to and the benefit of U.S. Provisional Application No. 62/196,437, filed on Jul. 24, 2015, which is incorporated herein by reference in its entirety.

TECHNICAL FIELD

This disclosure relates to the tuning of the relative phases between waveguides in an array, as applicable, for instance, in the field of photonic integrated circuits (PICs).

BACKGROUND

In wavelength division multiplexed systems, arrayed waveguide gratings (AWGs) are often used as optical multiplexers or demultiplexers. With reference to FIG. 1, an AWG 100 generally includes an array 102 of waveguides 103 typically having constant optical path length increments between adjacent waveguides 103, connected between an input free propagation region (FPR) 104 and an output FPR 106. When the AWG 100 operates as a wavelength demultiplexer, as depicted, input light including multiple wavelengths diffracting out of an input waveguide 108 or other input coupler into the input FPR 104 propagates through the input FPR 104 to illuminate the input ports of the array 102 of waveguides 103. After propagating through the array 102 of waveguides 103 and accumulating different optical phases in different ones of the waveguides 103 due to the different respective optical path lengths, light exiting the array 102 of waveguides 103 at their output ports is refocused in the output FPR 106, whereby light of different wavelengths constructively interferes, and thus refocuses, at different locations. A plurality of output waveguides 110 or other output couplers may be placed at the various foci so as to capture light of the respective wavelengths. To operate the AWG 100 as a multiplexer, the direction of light propagation through the AWG 100, and thus the roles of the FPRs 104, 106, can be reversed: light of multiple wavelengths is coupled from multiple respective waveguides 110 into the FPR 106 (which thereby functions as the input to the AWG 100) and dispersed in the FPR 106 to illuminate the array 102 of waveguides 103, and after propagating through the array 102 of waveguides 103, the now mixed-wavelength light from all of the arrayed waveguides 103 is refocused in the FPR 104 (now functioning as the output of the AWG), from where it exits into the waveguide 108.

When implemented in PICs, AWGs are susceptible to a number of factors that can affect their wavelength response, often resulting in the mismapping of wavelengths to output waveguides. For example, due to fabrication tolerances of PICs, the effective index of the waveguides in the array may not be controlled accurately enough to achieve an intended wavelength response. Fabrication-based deviations from the intended response are especially likely if the waveguide dimensions are small, if the AWG waveguide core is in a deposited layer for which thickness control is poor, or if the refractive index of the waveguide core is dependent upon material growth or deposition conditions. In addition to these problems, the effective index of the waveguides in the array, and thus the wavelength response of the AWG as a whole, varies as a function of temperature. This effect is particularly pronounced where waveguide core materials having a large thermooptic coefficient, such as silicon, are used, and tends to limit the temperature range over which the AWG can be used. One approach to reducing undesirable wavelength shifts of the AWG response due to fluctuations in the ambient temperature, and/or to compensating for fabrication-based deviations from the desired wavelength response, involves actively controlling the temperature of the AWG, which, however, requires a significant amount of power, rendering the PIC less efficient.

DETAILED DESCRIPTION

Described herein, in various embodiments, are systems, devices, and structures for tuning the relative phases between waveguides in an array by the active, controlled application of heat to the waveguides, for example, for the purpose of tuning the wavelength response of AWGs or other dispersive gratings. In some embodiments, one or more heaters are disposed directly in an AWG in the vicinity of the waveguides (for instance, above, in between, or even partially overlapping with the arrayed waveguides) to impart an incremental heat-induced phase shift between the waveguides. (By "incremental phase shift between the waveguides" is herein meant that the phase shifts between adjacent waveguides are all in the same direction such that the cumulative phase shift changes monotonically across the array. In many but not necessarily all embodiments, the increments between adjacent waveguides are constant across the array.) In other embodiments, a separate multi-waveguide structure coupled to and focusing light onto the input FPR of an AWG includes one or more heaters to control the relative phases between the waveguides of the separate structure so as to shift a lateral position of the focus, thereby altering the wavelength response of the AWG; such a separate multi-waveguide structure is herein called a "beam sweeper" (or simply "sweeper"). (The "lateral position" herein denotes a position along a direction perpendicular to the general direction of propagation.)

Using a beam sweeper at the input of an AWG instead of a heater directly placed in the AWG is beneficial, in particular, in embodiments where the AWG includes a large number of waveguides, rendering the direct heating of the AWG waveguides energy-costly. A separate beam sweeper that has fewer waveguides than the AWG itself may allow for more efficient tuning of the AWG wavelength response. Beam sweepers in accordance herewith may also be used with dispersive gratings other than AWGs, such as, e.g., Echelle gratings or vertical grating couplers (where the beam sweeper may be used to tune the direction of the coupling beam). Furthermore, a beam sweeper as disclosed herein may find application apart from any dispersive gratings, e.g., in optical switching. Heaters used in AWGs or beam sweepers in any of these embodiment may be controlled based on the waveguide temperature as measured with suitable temperature-sensing elements.

Figure 1:
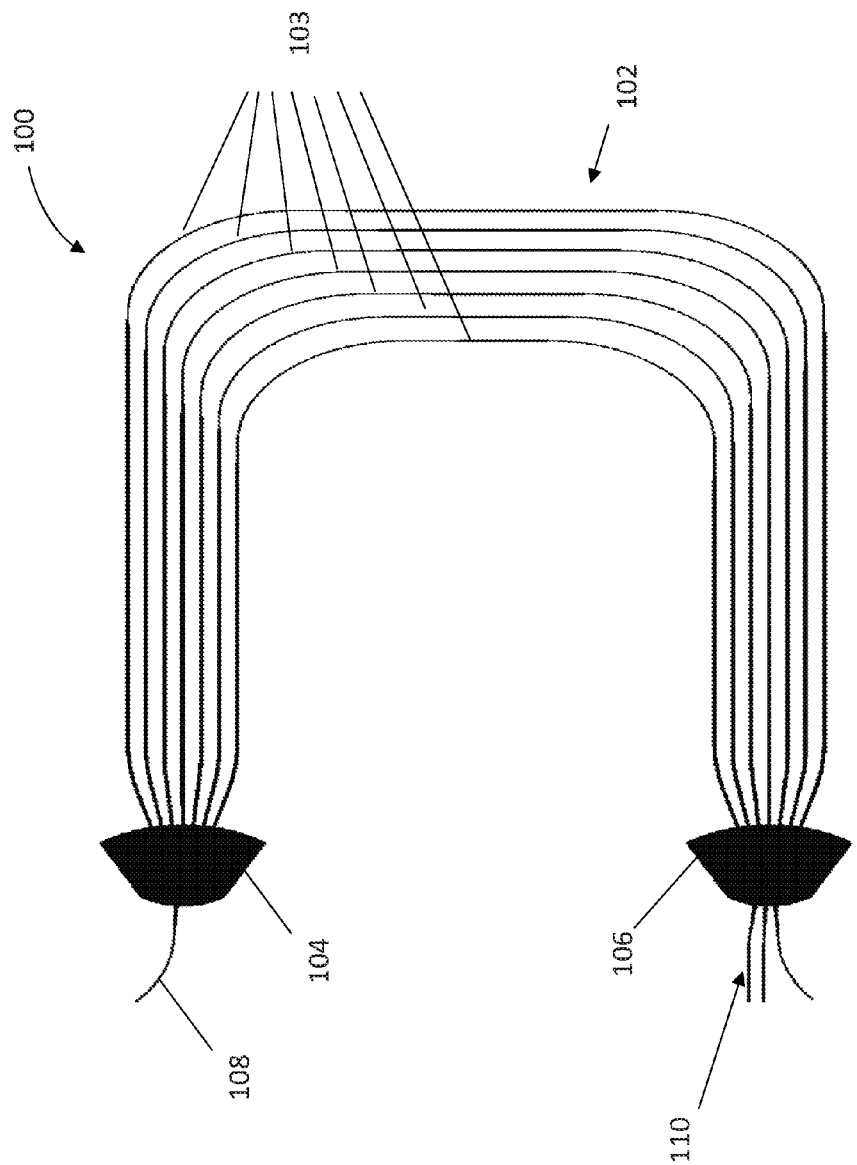
FIG. 1 is a schematic top view of an AWG as may be used in various embodiments.

In the context of AWGs, the terms "input FPR" and "output FPR" are herein used, for definiteness and to tie them to structure rather than function, with reference to an AWG operating as a demultiplexer. With these designations, operation of an AWG as a multiplexer involves light entering the AWG at the output FPR and exiting the AWG at the input FPR. In this manner, the term "input FPR" is used consistently to refer to the FPR into or out of which multiplexed (mixed-wavelength) light is coupled, and the term "output FPR" is used consistently to refer to the FPR out of or into which demultiplexed light (light of multiple separated wavelengths) is coupled; structurally, an output FPR may be distinguished from the input FPR, e.g., by virtue of the multiple output waveguides (e.g., with reference to FIG. 1, waveguides 110) emanating from it. Further, in embodiments including a sweeper and AWG, the sweeper is consistently coupled to the input FPR of the AWG, regardless whether the AWG is used as a demuliplexer (in which case light propagates through the sweeper before entering the AWG) or a multiplexer (in which case light propagates through the AWG before entering the sweeper). Note that, in accordance with some embodiments, the AWG can be bidirectional in that it exhibits a symmetry that allows it to function as either multiplexer or demultiplexer in either direction. In this case, the FPRs on both sides of the array of waveguides function as both input and output FPRs, e.g., by being each connected to both an input waveguide and multiple output waveguides. To tune the wavelength response of such a bidirectional AWG, beam sweepers may be coupled symmetrically to both input/output FPRs.

In accordance with various embodiments, the AWG and/or beam sweeper and associated heaters are implemented as part of a PIC in an SOI substrate including a silicon handle, a buried oxide layer disposed on top of the silicon handle, a silicon device layer disposed on top of the buried oxide layer, and a cladding layer disposed on top of the silicon device layer. For instance, waveguides and FPRs may be formed in the silicon device layer, and heaters and temperature-sensing elements may be embedded in the cladding layer. Alternatively, segments of a heater may be created directly in the silicon device layer, e.g., placed between the waveguides, by doping the silicon to alter is electrical resistance. Various structural features may serve to increase the efficiency of wavelength-response tuning via heat (as may be measured, for example, in terms of the power used to achieve a certain phase shift or, in the case of an AWG, wavelength shift). For example, a back-etched region in the silicon handle in a region underneath a heater may eliminate a significant portion of the heat sink that the silicon handle otherwise constitutes, substantially reducing heat dissipation into the silicon handle. Since removal of the silicon handle can result in mechanical stresses on the waveguides, which may, in turn, affect the wavelength response, the width of the back-etched region may be limited to limit the amount of stress, and may further be constant across the waveguides to ensure that any remaining stresses affect all waveguides uniformly (so as to avoid undesirable relative phase shifts). Heating efficiency may also be increased with thermal isolation trenches formed in the silicon device layer and/or the cladding layer surrounding the heated waveguide regions, which can serve to retain the generated heat in those regions and reduce heat dissipation into the substrate at large. Similarly, thermal isolation trenches may be formed within the heated region between heaters (or heater segments) and temperature-sensing elements to ensure that the generated heat is applied primarily to the adjacent waveguides rather than the temperature-sensing elements.

A further approach to increasing the wavelength-tuning efficiency of AWGs and/or sweepers as described herein involves the use of bidirectional pairs of heaters. A bidirectional pair of heaters includes first and second heaters that impart phase shifts of opposite signs between the waveguides such that, when light exiting the waveguides is focused down (e.g., by a sweeper onto the input FPR of an AWG, or in the output FPR of an AWG onto output waveguides), the first heater causes a shift in the lateral focus position in a direction opposite to that of a shift in the lateral focus position caused by the second heater. The first and second heaters are herein also referred to as the "forward heater" and "backward heater," respectively. (As will be readily appreciated, at any given time, only one of the heaters of the bidirectional pair is operated, i.e., the forward and backward heaters are not operated simultaneously.) Using a bidirectional pair of heaters, a given total phase-tuning range (corresponding to the phase difference between the two extreme phases) can be achieved with heaters each of which individually covers only half that range; this, in turn, reduces the peak power consumption associated with the tuning range to about one half, compared with the peak power consumption of a single heater achieving the same range.

In some embodiments, multiple heaters causing phase shifts in the same direction are used in parallel, accumulating the phase shifts induced by the individual heaters (which are subject to limits placed on the power that can be put through a heater) to achieve a greater total phase shift. Using multiple heaters in parallel reduces the drive voltage requirement associated with a given total phase shift, rendering the heaters deployable in systems where large drive voltages are not available and/or compatible with the electronics requirements of many standard photonics packages (such as, e.g., Quad Small Form-factor Pluggables (QSFPs)).

In various embodiments, the heaters are configured to impart a constant incremental phase shift between adjacent waveguides. For example, the heaters may be configured to generate a substantially uniformly heated region (as defined below) so as to impart a uniform phase shift per unit length of heated waveguide, the heated region being shaped and positioned such that heated waveguide portions increase, between adjacent waveguides, by constant length increments. For example, the heated region may be triangular in shape and overlap straight sections of evenly spaced waveguides. Alternatively, the waveguides may be spaced unevenly in the heated region, the spacings being designed based, e.g., on a given temperature distribution achievable with the heater to result in constant phase shifts between adjacent pairs of waveguides. In some embodiments, a heater is implemented by a current-carrying heating filament, e.g., made of platinum or tungsten (or some other suitable metal), that is wound across an area defining the heated region. The heating filament may have a constant width and/or cross-section within that area to simplify modeling of the resulting temperature distribution and/or facilitate more accurate results. As will be readily appreciated by one of ordinary skill in the art, approximating a region to be heated with a heating filament wound across an area defining that region will generally result in some level of variation in the temperature distribution across the heated region; a region is herein considered "substantially uniformly heated" if such variation in temperature is within an acceptable range. In some embodiments, the acceptable range is defined by ±10% of the average temperature within the region.

The foregoing will be more readily understood from the following detailed description of the drawings.

Figure 2A:
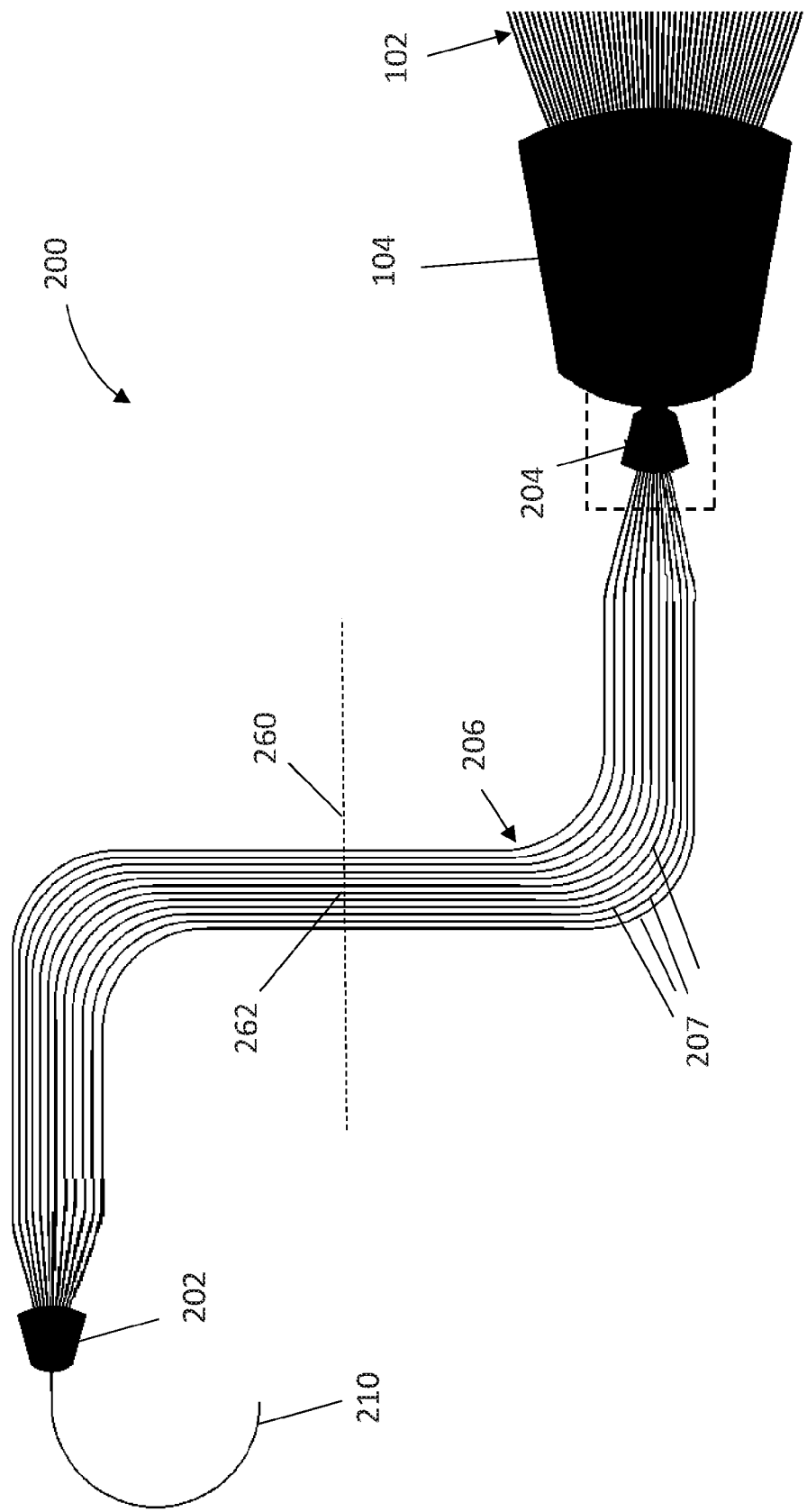
FIG. 2A is a top view of a beam sweeper coupled to the input FPR of an AWG, in accordance with various embodiments.

FIG. 2A is a top view of a beam sweeper 200 in accordance with various embodiments, coupled to the input FPR 104 of an AWG 100. As shown, the beam sweeper 200 includes an input FPR 202, an output FPR 204 adjoining, and thus optically coupled to, the input FPR 104 of the AWG 100, and an array 206 of waveguides 207 connecting the input and output FPRs 202, 204 of the sweeper 200. An input light signal may be provided to the input FPR 202 of the sweeper 200 via an input waveguide 210. (The designations of the FPRs 202, 204 of the sweeper 200 as "input FPR 202" and "output FPR 204" are used, consistently with the designations "input FPR 104" and "output FPR 106" of the AWG 100, with reference to the AWG 100 operating as a demultiplexer. That is, when the AWG 100 operates as a demultiplexer, the beam sweeper 200 precedes the AWG 100, and light propagates in the sweeper 200 from the input FPR 202 to the output FPR 204. When the AWG 100 operates as a multiplexer, the beam sweeper 200 follows the AWG 100 in the direction of light propagation, with light entering the beam sweeper 200 at the output FPR 204 and exiting the sweeper 200 at the input FPR 202.)

Figure 2B:
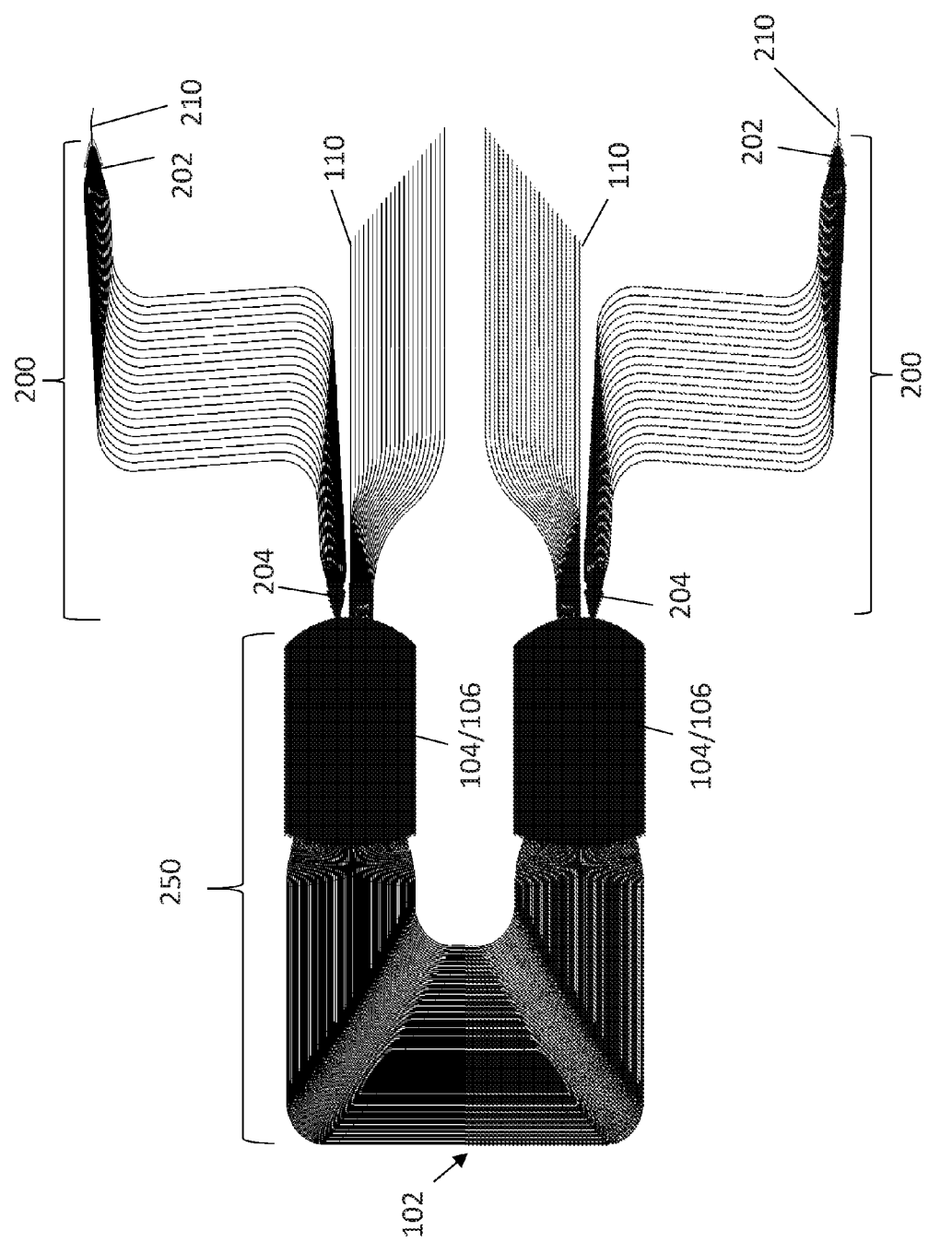
FIG. 2B is a top view of a system including a bidirectional AWG and beam sweepers coupled to both FPRs of the AWG, in accordance with various embodiments.

FIG. 2B is a top view of a system including a bidirectional AWG 250 and beam sweepers 200 coupled to both FPRs of the AWG 250, in accordance with various embodiments. Here, the FPRs on either end of the waveguide array 102 are structurally and functionally both input and output FPRs 104/106. To be able to serve as output FPR, each of the FPRs 104/106 is coupled to output waveguides 110. To be able serve as an input FPR, each of the FPRs 104/106 is further coupled to the output FPR 204 of a beam sweeper 200 that receives its mixed-wavelength input light through an input waveguide 210 at input FPR 202. In the illustrated embodiment, the system including the AWG 250 and the two beam sweepers 200 coupled thereto (as well as the AWG 250 itself) is symmetric.

Figure 3:
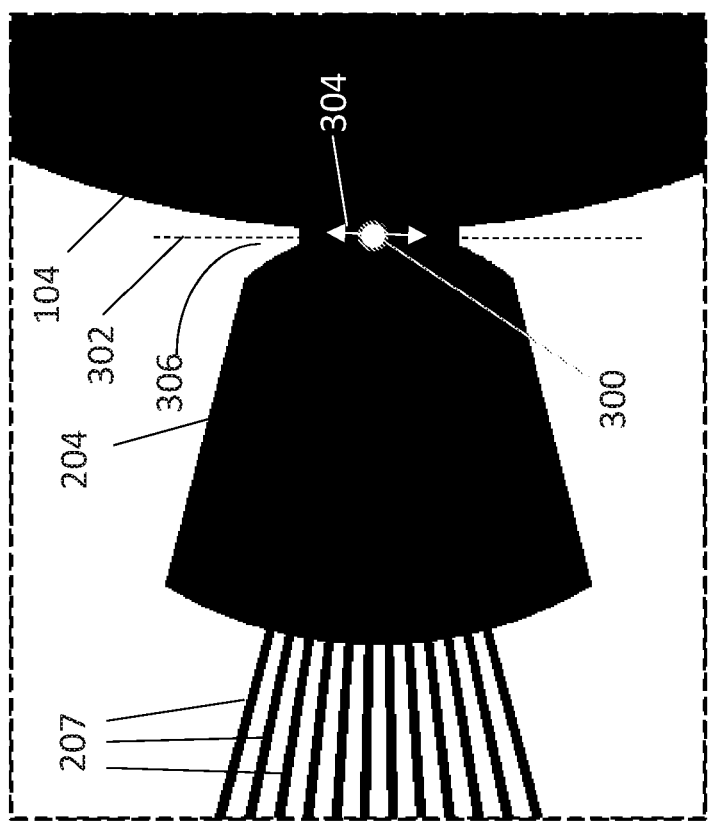
FIG. 3 is a close-up top view of the coupling region between the beam sweeper and the AWG of FIG. 2A, in accordance with various embodiments.

With renewed reference to FIG. 2A, the waveguides 207 and output FPR 204 of the sweeper 200 may be configured to focus light propagating in the waveguides 207 from the input FPR 202 to the output FPR 204 of the sweeper 200 at an interface of the sweeper 200 with the AWG 100. For example, as shown in the close-up view of the coupling region between sweeper 200 and AWG 100 provided in FIG. 3, the sweeper waveguides 207 may be oriented, in a region immediately preceding the output FPR 204, along rays emanating from a common center point 300 at the interface 302. Similarly, the AWG waveguides 103 may be oriented, in a region immediately following the input FPR 104 of the AWG 100, along rays emanating from the same (or substantially the same) center point 300. (The term "substantially" herein accounts for slight offsets between the center points corresponding to the rays along which the AWG waveguides 103 are oriented and the rays along which the sweeper waveguides 207 are oriented, respectively, as may arise in practice, e.g., due to fabrication inaccuracies, and generally does not affect the functioning of the device.) Further, the entrance surface of the output FPR 204 of the sweeper 200 and the exit surface of the input FPR 104 of the AWG 100 may each coincide with the circumference of a circle centered at point 300, with the waveguides 207, 103 being perpendicular to the respective surface (due to their arrangement on rays emanating from the center point 300).

In the absence of heat applied to the sweeper waveguides 207, light exiting the waveguides 207 will be focused at the point 300, and dispersed from point 300 into the input FPR 104 of the AWG to illuminate the input ports of the AWG waveguides 103. When the heater(s) of the sweeper 200 are used to impose a linear phase variation across the array 206 of waveguides 207, the focus at the interface 302 is translated laterally (side-ways) away from the center point 300 (as indicated by arrows 304), resulting in an altered wavelength response of the AWG 100. As the total phase shift applied across the array 206 is tuned continuously between one extreme and the other (e.g., between zero and the maximum phase shift for a single heater, or between the maximum phase shifts in either direction for a bidirectional pair of heaters), the focus traces a line along the interface 302.

The output FPR 204 of the sweeper 200 and the input FPR 102 of the AWG 100 may be, and generally are when implemented in SOI substrates, contiguous. In the depicted embodiment, the FPRs 204, 104 are shaped to form a constriction or "waist" 306 at the interface 302. This waist 306 can serve as a spatial filter that prevents light of higher diffraction orders from entering the input FPR 104 of the AWG 100; when the AWG 100 is used as a demultiplexer, this may result in wavelength channels separated onto their respective output waveguides 110 with reduced cross-talk. The waist 306 also provides a demarcation between the FPRs 204, 104. Note, however, that a waist between the FPRs 206, 104 need not be formed in every embodiment. Rather, the contiguous region formed by the FPRs 204, 104 may be devoid of a clear visual boundary between the FPRs 204, 104 of the sweeper 200 and AWG 100. Therefore, the interface 302 is herein defined functionally as the focal plane at the output of the sweeper 200, that is, the vertical plane going through the focus at point 300 and oriented perpendicular to the general direction of propagation.

Returning again to FIG. 2A, in various embodiments, the waveguides 207 of the beam sweeper 200 are equal in length, which avoids wavelength-dependent dispersion to ensure that light of all wavelengths is focused in the same spot (about point 300) at the output of the sweeper 200. (Of course, once a phase gradient is applied across the array 206 of waveguides 207, slight wavelength dispersion results. However, this effect is so small as to be negligible. Typically, the maximum heat-induced phase shift between two adjacent waveguides in the sweeper 200 amounts to merely a small fraction of the center wavelength. For comparison, the optical path difference between two adjacent waveguides in an AWG may be on the order of tens of wavelengths.) The depicted configuration of equal-length waveguides is characterized by an array consisting of two equal portions, corresponding to the portions above and below the horizontal line 260 through a symmetry center 262, that map onto one another if one portion is rotated by 180° about the symmetry center 262.

When used in conjunction with an AWG 100, the sweeper 200 generally includes fewer waveguides than the AWG 100 in order to reduce the power requirements associated with tuning the wavelength response of the AWG 100 (compared with the use of heaters included directly above the waveguides 103 of the AWG 100). On the other hand, the waveguide array 206 of the sweeper 200 is generally provided with a sufficient number of waveguides 207 to limit the insertion loss at the input FPR 202 to an acceptable level and achieve a desired image quality of the focus generated at the output of the sweeper 200 (that is, at the interface 300 between the output FPR 204 and the input FPR 104 of the AWG 100). With too few waveguides 207 in the sweeper 200, a significant portion of the light from the input waveguide 210 may not be captured by the waveguide array 206, and/or a significant portion of light at the output may be concentrated in side lobes of the focus rather than the central focus area. Usually, it is desirable to generate a focus that is to good approximation Gaussian. In various embodiments, the array 206 in the sweeper 200 includes at least three, and typically more (e.g., about 15-30), waveguides 207.

Figure 4:
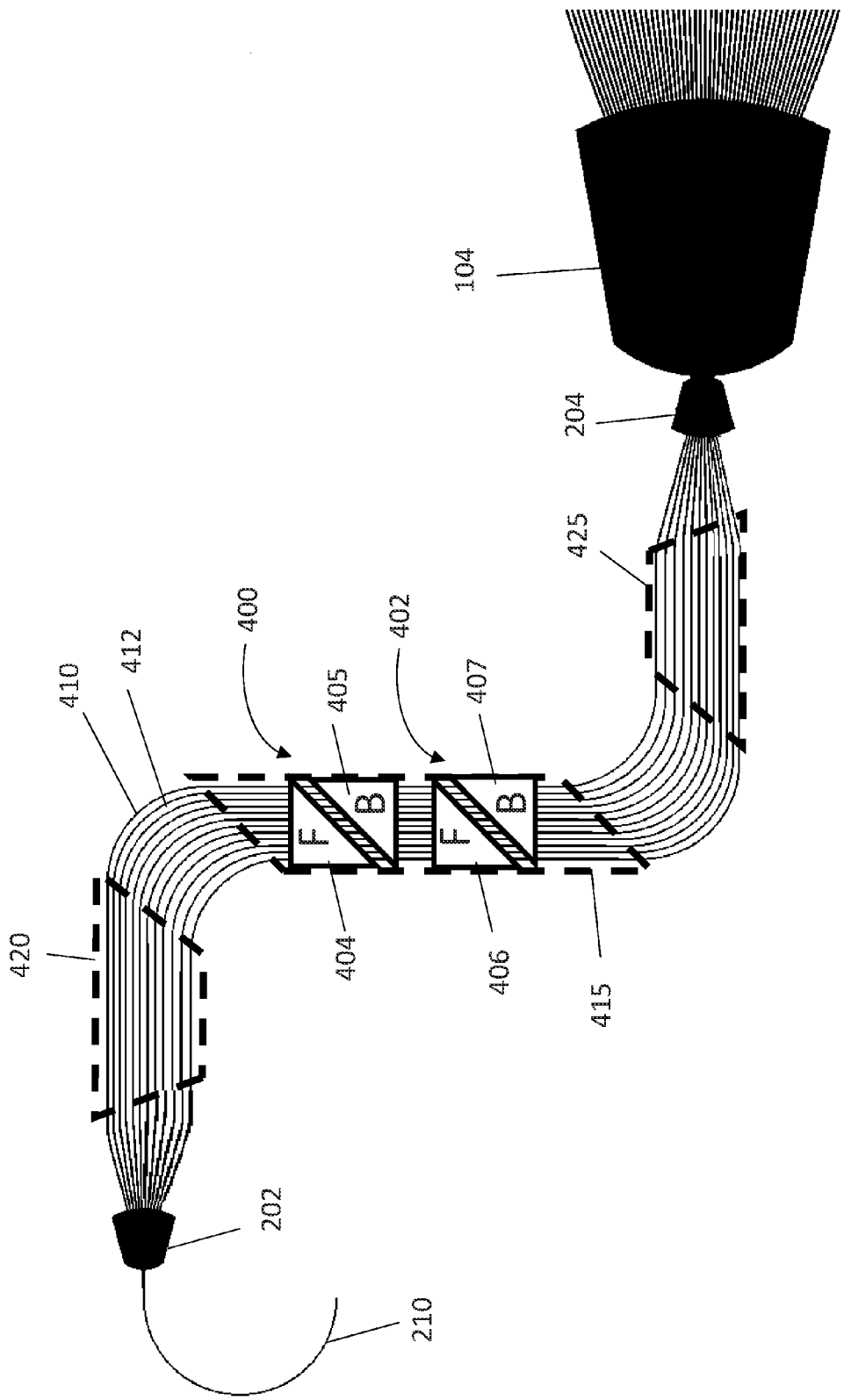
FIG. 4 is another top view of the beam sweeper of FIG. 2, further illustrating the placement of heating regions in straight waveguide sections, in accordance with various embodiments.

Referring now to FIG. 4, the placement of heaters in the beam sweeper 200, in accordance with some embodiments, is illustrated in a further top view. In general, the beam sweeper 200 may include one or more heaters, for example, multiple heaters driven in parallel to obtain a larger overall phase-tuning range at a given drive voltage per heater, or one or more bidirectional pairs of heaters causing phase shifts in mutually opposite directions (indicated by "F" for forward heaters and "B" for backward heaters). In the illustrated embodiment, the sweeper 200 includes two bidirectional pairs 400, 402 of heaters 404, 405, 406, 407. The heaters are generally placed laterally overlapping (i.e., overlapping in a top view) with the waveguides 207, in the same or a different layer. For instance, in some embodiments, the heaters are placed above the waveguides 207 (see also FIG. 6), and in other embodiments, the heaters are placed within the layer defining the waveguides 207 (and potentially include portions of the waveguides 207). As shown, the heaters 404, 405, 406, 407 may be placed above (or within) straight sections of the waveguides 207, which may simplify thermal modeling of the heat-induced phase shifts.

In accordance with various embodiments, the heaters are configured to cause a constant incremental phase shift between pairs of adjacent waveguides 207. In principle, this can be achieved, for example, by uniformly heating a triangular region overlapping evenly spaced waveguides, with one edge of the triangle being oriented in parallel with the waveguides such that the length of the waveguide portions overlapping with the triangular region increases by a constant increment between adjacent waveguides. In conjunction with a uniform phase shift per unit length of heated waveguide, as results from a uniform temperature across the heated region, this configuration can achieve the desired constant incremental phase shift. In practice, however, it may be difficult to heat the triangular region sufficiently uniformly. In this case, the spacings between the waveguides may be adjusted, based on thermal modeling, to achieve constant phase increments despite the nonuniform temperature distribution. The geometry of the waveguide array 206 shown in FIGS. 2 and 4 facilitates modifying the waveguide spacings as desired without affecting the overall length of any waveguide, thereby maintaining equal lengths of all of the waveguides 207. For example, to increase the spacing between the top waveguide 410 and its adjacent waveguide 412 in the straight waveguide region 415, the length of the straight section of the top waveguide 410 in the top region 420 may be decreased, and the length of the straight section of the top waveguide 410 in the bottom region 425 increased, by the same distance. The spacing between any other pair of waveguides 207 can be adjusted similarly by modifying the length of one of the waveguides by equal but opposite-signed amounts in the top and bottom regions 420, 425.

Figure 5:
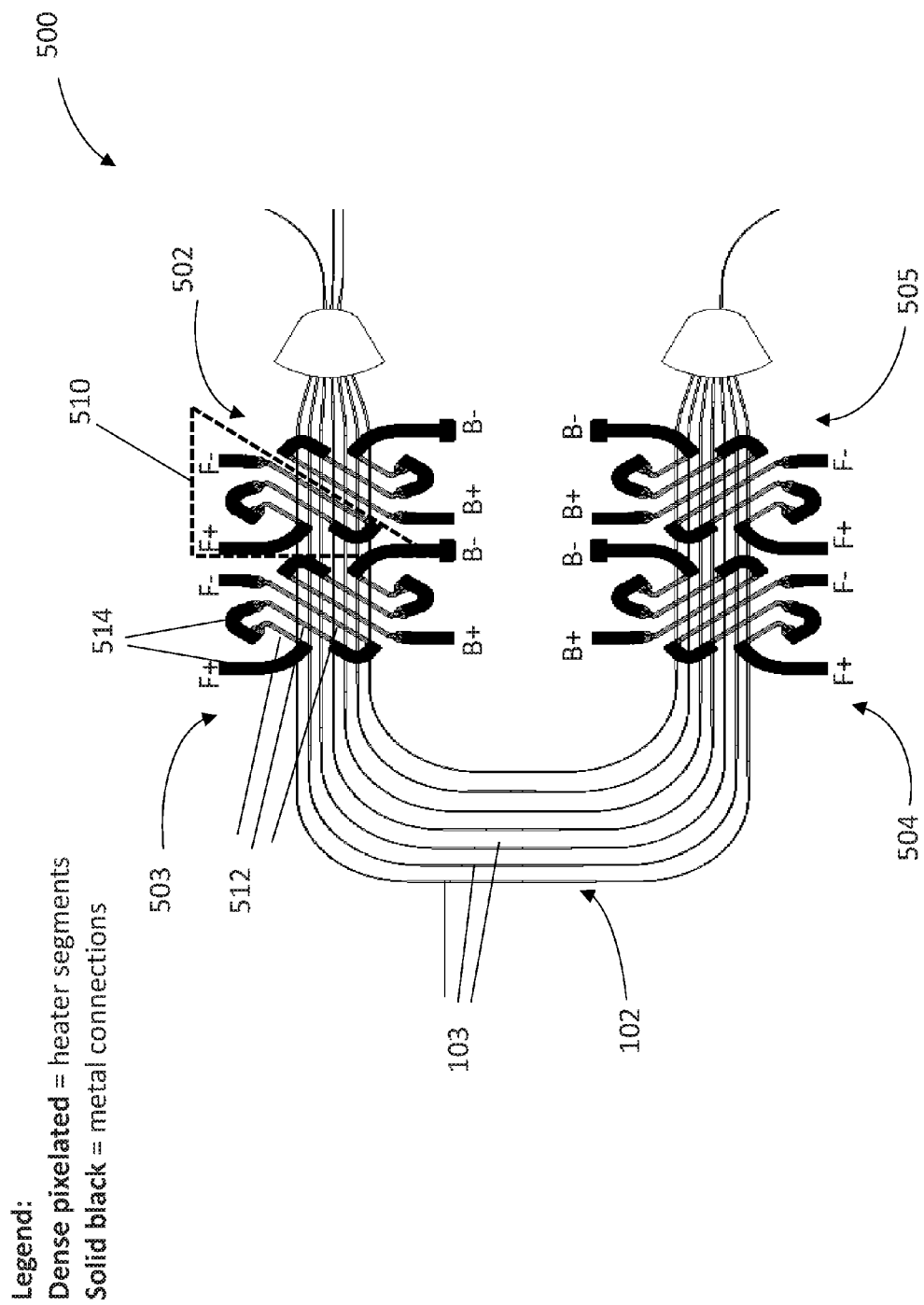
FIG. 5 is a top view of an AWG having heaters disposed above straight sections of the waveguides, in accordance with various embodiments.

FIG. 5 is a top view of an example AWG 500 having heaters disposed above straight sections of the waveguides 103, in accordance with various embodiments. Here, the wavelength response of the AWG 500 is tuned directly by heat-induced phase shifts imparted on the waveguides 103 of the AWG 500, rather than by a separate beam sweeper 200 at the input FPR 104 of the AWG 500. Various features of heaters included in a beam sweeper 200, as described above, are equally applicable for the heaters in an AWG. For instance, the AWG may generally include one or more heaters, and may use one or more bidirectional pairs of forward and backward heaters and/or multiple heaters driven in parallel. In the illustrated example, the AWG 500 includes four bidirectional pairs of heaters 502, 503, 504, 505. As shown, the bidirectional pairs of heaters 502, 503, 504, 505 are arranged symmetrically above straight sections of the array 102 waveguides 103. Beneficially, heater placement above straight sections allows using identical designs for the forward and backward heaters while achieving maximum phase shifts of equal magnitude in each direction. Note, however, that heaters can generally also be placed above the curved sections of the array 102 of waveguides 103.

FIG. 5 further illustrates the configuration and design of the individual heaters in more detail. As shown, each heater (e.g., forward heater 510 of pair 502, indicated by an enclosing dashed line) may include multiple filamentous resistive heating segments 512 geometrically arranged in parallel and having suitable lengths to collectively define a heated region of a desired shape. In the illustrated embodiment, for example, the heating segments 512 of each heater collectively define a triangular region. Within each individual heater, the heating segments 512 are connected in series by metal connections 514 so as to effectively form a single heating filament wound across the heated region. A voltage applied between the electrical connection nodes (labeled F+ and F- for the two polarities of the forward heater and B+ and B- for the two polarities of the backward heaters) at opposite ends of the heating filament causes an electrical current that resistively heats the filament. Note, however, that the heating segments 512 and the metal connections 514 therebetween may differ in their cross-sectional dimensions and material properties and, as a result, their respective electric resistances. For example, low-resistance metal connections 514 may be used with higher-resistance heating segment 512 such that, as an electric current flows through the filament, heat is generated preferentially in the heating segments 512. The forward heaters may be driven in parallel by connecting their respective positive connection nodes F+ to one another and connecting their respective negative connection nodes F- top one another. Similarly, the backward heaters may be driving in parallel by connecting respective nodes of the same polarities to one another.

In accordance with various embodiments, thermal modeling is used to compute, based on the configuration of the heating filament in a heater, the resulting temperature distribution created by the heater. From this distribution, the phase shifts imparted on the waveguides can, in turn, be computed. In some embodiments, the heating filaments, or at least the heating segments therein, have a constant width and cross-section, which simplifies the modeling. The heater and waveguides collectively may be configured to achieve a desirable constant incremental phase shift between pairs of adjacent waveguides. For example, a triangular heated region of uniform temperature (if achievable) may be used in conjunction with evenly spaced waveguides. For non-uniform temperature distributions, the spacing of the waveguides underneath the heater may be adjusted; for example, if the temperature falls off from a maximum temperature in accordance with an approximately exponential profile, the spacing between waveguides may be increased towards the exponential tail.

Turning now to the implementation of AWGs and beam sweepers as described above in PICs, FIG. 6 is a cross-section of an example SOI substrate 600 having a multi-waveguide structure and associated heating segments and temperature-sensing elements implemented therein, in accordance with various embodiments. The SOI substrate 600 includes a silicon handle 602, a buried oxide (BOX) layer 604 disposed above the handle 602, a silicon device layer 606 on top of the BOX layer 604, and a dielectric cladding layer 608 above the silicon device layer 606. A plurality of silicon rib waveguides 610 are formed in the silicon device layer 606. The space between the rib waveguides 610 (e.g., created by etching) may be filled with dielectric material (e.g., the same material as used for the cladding layer 608). The rib waveguides 610 may implement the arrayed waveguides 103, 207 of an AWG or beam sweeper as described herein.

Figure 6:
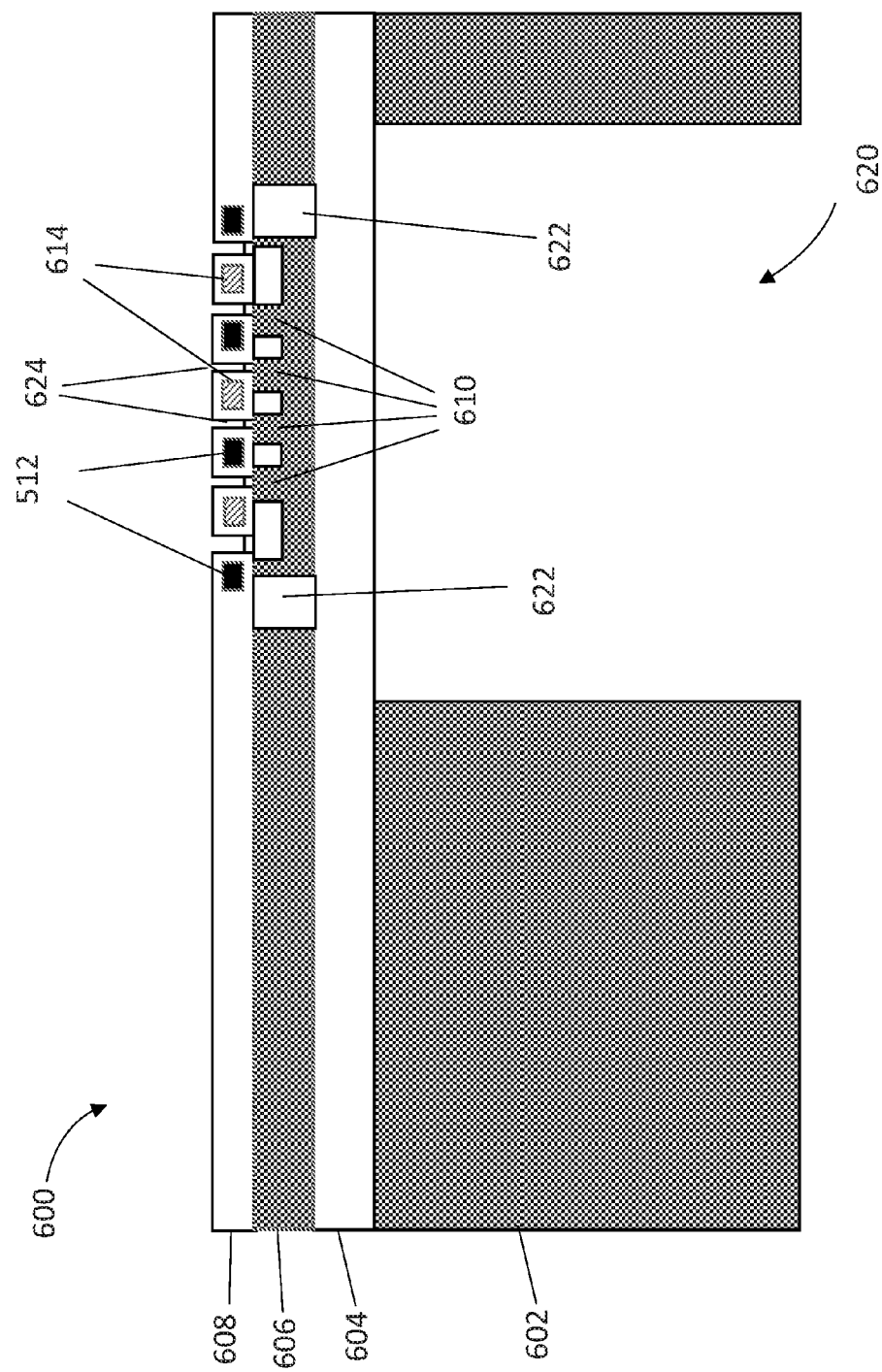
FIG. 6 is a cross-sectional view of an SOI substrate having a multi-waveguide structure and associated heater and temperature-sensing elements implemented therein, in accordance with various embodiments.

In the example embodiment of FIG. 6, the heaters are implemented by heating segments 512 disposed above the waveguides 610 in the cladding layer 608. Alternatively or additionally to being disposed in the layer 608 above the waveguides 610, heating segments 512 may also be created within the silicon device layer 606 (not shown), e.g., by doping the silicon to render it resistive; in this case, the heating segments 512 may be placed between the waveguides 610 or even include portions of (in other words, at least in part spatially overlap with) the waveguides 610. In either case, the heating segments 512 overlap laterally with the waveguides, meaning that their projections into a horizontal plane overlap. Further, as shown, temperature-sensing elements 614, e.g., forming the segments of a resistive thermal device (RTD), may be embedded in the cladding layer 608 to directly measure the temperature in the heated region. The temperature-sensing elements 614 and heating segments 512 may be arranged in an alternating fashion.

Based on the temperature within a heated region as measured by temperature-sensing elements 614, the temperature-dependence of the phase shift imparted by deliberately heating the waveguides (or the temperature-dependence of a resulting optical characteristic such as, in a sweeper, the lateral shift in the focus at the sweeper output) can be calibrated. Alternatively, the phase shift as a function of the voltage or current applied to the heater may be calibrated (obviating, in some embodiments, the need for sensing the temperature of the heated region). To compensate for an undesired phase shift of the AWG 100 due to a change in the ambient temperature, the temperature of the waveguides 103 of the AWG 100 in a region outside the heater may be measured to determine therefrom how much tuning is needed. Accordingly, in various embodiments, temperature-sensing elements are included both within and near the heated region (in the sweeper or a directly heated waveguide section of the AWG, as the case may be) and in a region away from the heater.

Figure 7:
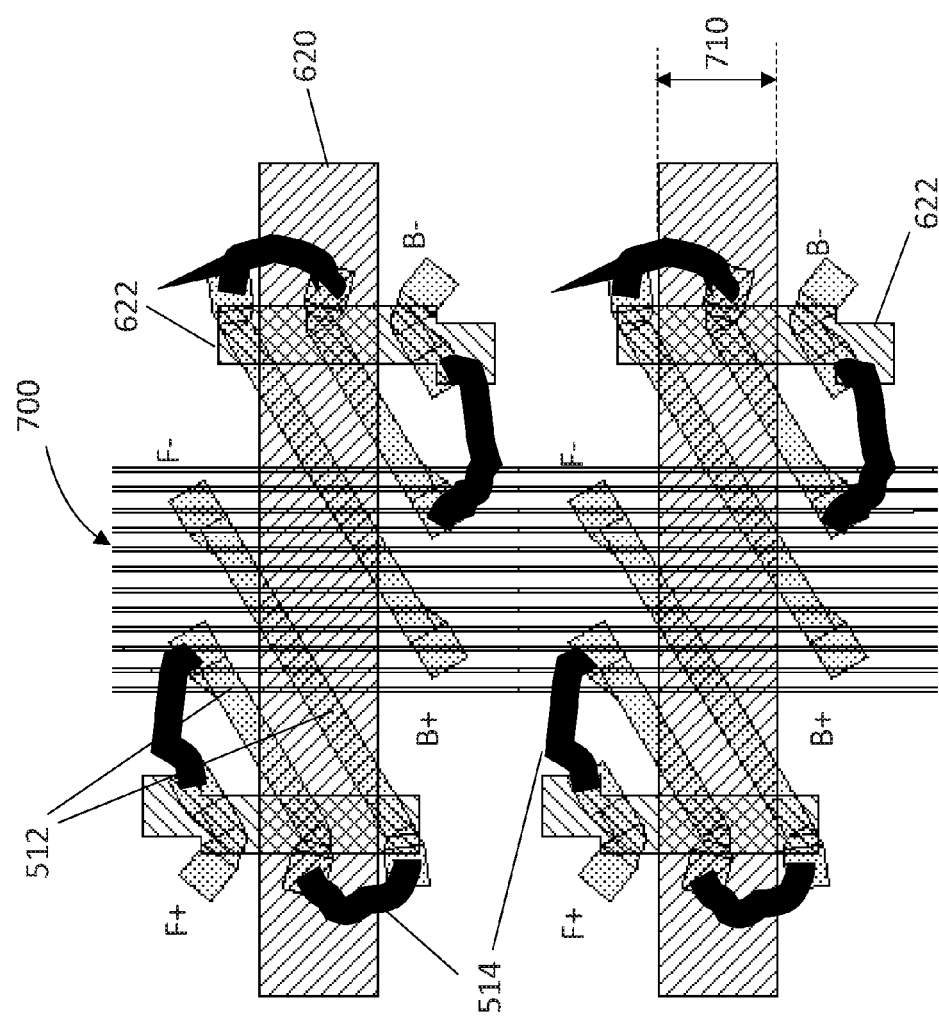
FIG. 7 is a top detail view of heaters disposed above a straight waveguide section, in accordance with various embodiments.

With renewed reference to FIG. 6 and reference further to FIG. 7, which provides a top detail view of two heaters disposed above a straight section of waveguides 700, various features directed at increasing the efficiency of thermal phase-tuning are illustrated. One such feature is a back-etched region 620 in the silicon handle 602, located directly underneath the heated waveguide region. Silicon removal underneath the heater serves to eliminate heat dissipation into the silicon handle 602 within the back-etched region 620, which helps to retain more heat in the heated region of the silicon device layer 606. In accordance with various embodiments, silicon is fully removed within the boundaries of the back-etched region 620, without leaving any silicon "islands," so as to maximize the effect of the back-etch. On the other hand, in order to avoid an unnecessary loss in structural stability of the SOI substrate 600, silicon removal from the handle 602 is confined, in accordance with various embodiments, to a region 620 substantially coinciding with an area defined by the heater (e.g., not exceeding maximum lateral dimensions of the heater by more than 20%). This is illustrated more clearly in FIG. 7. As shown, the back-etched region 620 may, for example, be within the outer limits of the heating segments 512 in the direction of the waveguides 700 and extend only slightly beyond the outer limits of the heating segments 512 in the direction perpendicular to the waveguides 700 (e.g., such that the dimension of the back-etched region 620 measured perpendicularly to the waveguides 700 exceeds that of the heater by no more than 20%).

Besides the effect on the overall structural stability of the SOI substrate 600, another concern associated with a back-etched region 620 underneath the waveguides 610, 700 are mechanical stresses imposed on the waveguides due to the nonuniformity of the substrate. Limiting the width 710 of the back-etched region 620, measured in the direction of the waveguides 700, can minimize this problem. In some embodiments, the width 710 of the back-etched region 620 is less than 40 µm; for comparison, typical dimensions of the waveguide array within an AWG may be on the order of 200 µm×200 µm. Thus, the back-etched region 620 is significantly smaller in area than the waveguide array. In addition, the effect of any remaining mechanical stresses on the phase of the waveguides can be neutralized by ensuring that all waveguides experience the same stress level. This, in turn, may be achieved by using a back-etched region 620 that has a constant width 710 across the array of waveguides (e.g., that is rectangular in shape) and placing the heater, and thus the back-etched region, in a region of the waveguide array where the waveguides are straight and/or have constant curvature (straight waveguides corresponding to zero curvature), or by otherwise ensuring that the length of waveguide overlapping the back-etched region 620 is the same for all waveguides.

In addition to removing the heat sink underneath the heater, the tuning efficiency may be increased by thermally isolating the heated region from surrounding regions in the silicon device layer. For this purpose, various embodiments include thermal isolation channels (or, if open at the top, "trenches") 622 in the silicon device layer 606 (as shown) and/or the dielectric cladding layer 608 (not shown) alongside the waveguides 610, 700 on either or both sides of the waveguide array, surrounding the heated portions of the waveguides. Further, in embodiments that include temperature-sensing elements 614 adjacent (e.g., arranged alternatingly with) the heating segments 512, thermal isolation trenches 624 may be included between adjacent heating and temperature-sensing elements 512, 614 such that the heat is applied primarily to the waveguides 610 rather than the temperature-sensing elements 614.

Figure 8:
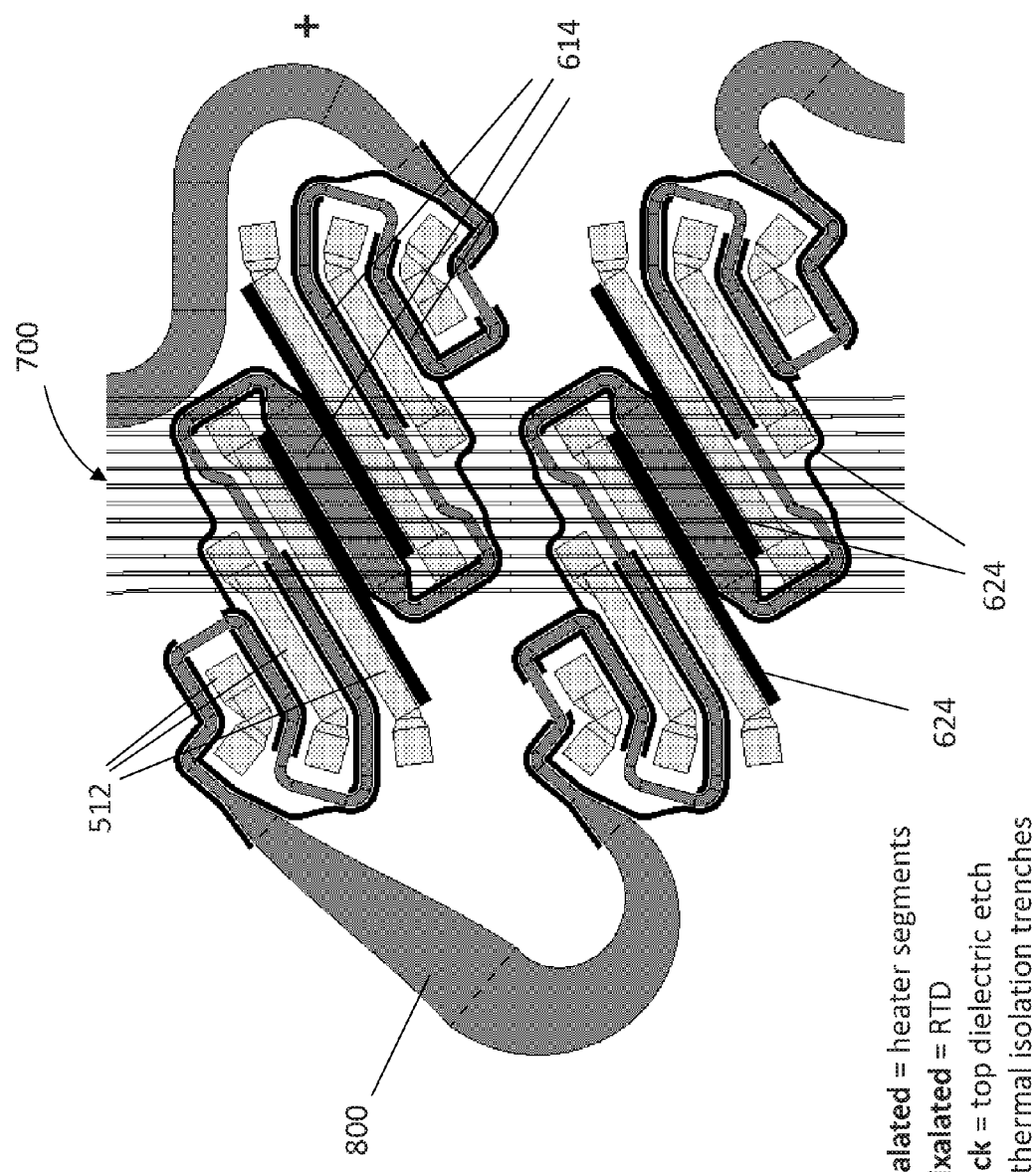
FIG. 8 is another top detail view of the heaters of FIG. 7, further illustrating the placement of temperature-sensing elements and thermal isolation trenches in accordance with various embodiments.

FIG. 8 is another detail view of the heaters of FIG. 7, showing the placement of temperature-sensing elements 614 and thermal isolation trenches in accordance with various embodiments. The view corresponds to a horizontal cross-section taken through the dielectric cladding layer 608, overlaid onto a top view of the waveguides 700. As shown, the temperature-sensing elements 614 are placed between the heating segments 512 in parallel therewith, and are serially connected, by metal connections, to form a continuous temperature-sensing filament 800 winding across the area defined by both heaters. Thermal isolation trenches 624 line the sides of portions of the temperature-sensing filament 800, in particular, in regions between the heating segments 512 and the temperature-sensing elements 614.

The following numbered examples are illustrative embodiments.

1. A PIC comprising: a silicon-on-insulator (SOI) substrate comprising a silicon handle, a buried oxide layer disposed on top of the silicon handle, a silicon device layer disposed on top of the buried oxide layer, and a cladding layer disposed on top of the silicon device layer; formed at least partially within the silicon device layer, an AWG comprising an array of waveguides connected between an input FPR and an output FPR, the waveguides varying in optical path length varying in optical path length incrementally across the array to thereby cause wavelength dispersion; disposed at least partially within at least one of the cladding layer or the silicon device layer, one or more bidirectional pair of heaters laterally overlapping with the array of waveguides and configured to impart an incremental heat-induced phase shift between the waveguides to thereby alter the wavelength dispersion of the AWG; and one or more back-etched regions formed within the silicon substrate underneath respective one or more bidirectional pair of heaters.

2. The PIC of example 1, wherein the back-etched region has a constant width across the array of waveguides.

3. The PIC of example 2, wherein the constant width does not exceed forty micrometers.

4. The PIC of any of the preceding examples, wherein the one or more back-etched region are confined to regions substantially coinciding with areas defined by the respective one or more bidirectional pairs of heaters.

5. The PIC of any of the preceding examples, wherein the heaters laterally overlap with a straight section of the array of waveguides.

6. The PIC of any of examples 1-4, wherein the heaters laterally overlap with a section of the array of waveguides in which the waveguides all have a common curvature.

7. The PIC of any of the preceding examples, further comprising thermal-isolation channels formed in at least one of the silicon device layer or the cladding layer surrounding heated regions of the array of waveguides.

8. The PIC of any of the preceding examples, wherein each of the heaters comprises a heating filament winding across an area laterally overlapping with a region of the array of waveguides to be heated.

9. The PIC of example 8, wherein the heating filaments comprise heating segments of equal and constant width connected by metal connections.

10. The PIC of example 8, further comprising temperature-sensing elements embedded in the cladding layer between heating segments of the heating filament.

11. The PIC of claim 10, further comprising thermal isolation trenches formed in the cladding layer between adjacent heating segments and temperature-sensing elements.

12. The PIC of any of examples 1-9, wherein each of the heaters comprise doped, resistive regions in the silicon device layer.

13. The PIC of any of the preceding examples, comprising a plurality of bidirectional pairs of heaters configured to operate in parallel.

14. The PIC of any of the preceding examples, wherein each of the heaters is configured to impart a constant incremental phase shift between all pairs of adjacent waveguides of the array.

15. The PIC of example 14, wherein each of the heaters is configured to heat a heated region spatially overlapping with the array of waveguides to a substantially uniform temperature so as to impart a uniform phase shift per unit length of heated waveguide, the heated region being shaped and positioned such that heated waveguide portions increase, between all pairs of adjacent waveguides, by constant length increments.

16. The PIC of example 15, wherein the waveguides are uniformly spaced in the heated region and the heated regions are triangular in shape.

17. The PIC of any of examples 14-16, wherein spacings between the waveguides are selected based on a temperature distribution associated with the heaters to achieve the constant incremental phase shift.

18. A system comprising: an AWG comprising a plurality of waveguides connected between a first input FPR and a first output FPR; and a beam sweeper for tuning a wavelength response of the AWG, the beam sweeper comprising a second input FPR, a second output FPR adjoining and optically coupled to the first input FPR of the AWG, at least three waveguides connected between the second input FPR and the second output FPR, the at least three waveguides and the second output FPR being configured to focus light propagating in the at least three waveguides from the second input FPR to the second output FPR at a focus at an interface between the second output FPR and the first input FPR, and at least one bidirectional pair of heaters laterally overlapping with the at least three waveguides, each of the heaters configured to impart an incremental phase shift between the light propagating in the at least three waveguides to thereby shift a lateral position of the focus.

19. The system of example 18, wherein the at least three waveguides of the beam sweeper are fewer in number than the waveguides of the AWG.

20. The system of example 18 or example 19, wherein the at least three waveguides of the beam sweeper are arranged, in a region immediately preceding the second output FPR, along rays emanating from a common center at the interface of the second output FPR with the first input FPR.

21. The system of example 20, wherein the plurality of waveguides of the AWG are arranged, in a region immediately following the first input FPR, along rays emanating from the center.

22. The system of any of examples 18-21, wherein the at least three waveguides of the beam sweeper are all equal in length.

23. The system of any of examples 18-22, wherein each of the heaters is configured to impart a constant incremental phase shift between all pairs of adjacent waveguides of the at least three waveguides.

24. The system of example 23, wherein each of the heaters is configured to heat a heated region spatially overlapping the at least three waveguides to a substantially uniform temperature so as to impart a uniform phase shift per unit length of heated waveguide, the heated region being shaped and positioned such that heated waveguide portions increase, between all pairs of adjacent waveguides, by constant length increments.

25. The system of example 24, wherein the at least three waveguides are uniformly spaced and the heated regions are triangular in shape.

26. The system of example 23, wherein spacings between the at least three waveguides are selected based on a temperature distribution associated with the heaters to achieve the constant incremental phase shift.

27. The system of any of examples 18-27, wherein each of the heaters comprises a heating filament winding across an area laterally overlapping the at least three waveguides in a region to be heated.

28. The system of example 10, wherein the heating filaments comprise segments of equal and constant width connected by metal connections.

29. The system of any of examples 18-28, comprising a plurality of bidirectional pairs of heaters, each pair comprising a forward heater and a backward heater, at least some of the forward heaters or at least some of the backward heaters being configured to operate in parallel.

30. The system of any of examples 18-29, wherein the heaters laterally overlap with a section of the at least three waveguides in which the at least three waveguides all have a common curvature.

31. The system of example 30, wherein the heaters laterally overlap with straight sections of the at least three waveguides.

32. The system of any of examples 18-31, wherein the AWG and the beam sweeper are implemented in a PIC comprising an SOI substrate including a silicon handle, a buried oxide layer disposed on top of the silicon handle, a silicon device layer disposed on top of the buried oxide layer, and a cladding layer disposed on top of the silicon device layer.

33. The system of example 32, further comprising a back-etched region in the silicon handle underneath the bidirectional pair of heaters.

34. The system of example 33, wherein the back-etched region has a constant width across the at least three waveguides.

35. The system of example 32, further comprising thermal-isolation channels formed in at least one of the silicon device layer or the cladding layer surrounding heated portions of the at least three waveguides.

36. The system of example 35, wherein the heaters comprise heating segments embedded in the cladding layer.

37. The system of example 36, further comprising temperature-sensing elements embedded in the cladding layer in between the heating segments.

38. The system of example 37, further comprising thermal isolation trenches in the cladding layer in between adjacent heating segments and temperature-sensing elements.

39. The system of example 32, wherein the heaters comprise doped, resistive regions in the silicon device layer.

40. The system of any of examples 18-39, wherein the AWG is bidirectional, the system further comprising a second sweeper comprising a third input FPR, a third output FPR adjoining and optically coupled to the first output FPR of the AWG, at least three waveguides connected between the third input FPR and the third output FPR, the at least three waveguides and the third output FPR being configured to focus light propagating in the at least three waveguides from the third input FPR to the third output FPR at a focus at an interface between the third output FPR and the first output FPR, and at least one bidirectional pair of heaters laterally overlapping with the at least three waveguides, each of the heaters configured to impart an incremental phase shift between the light propagating in the at least three waveguides to thereby shift a lateral position of the focus.

41. A system comprising: an AWG comprising a plurality of waveguides connected between a first input FPR and a first output FPR; and a beam sweeper for tuning a wavelength response of the AWG, the beam sweeper comprising a second input FPR, a second output FPR adjoining and optically coupled to the first input FPR of the AWG, at least three waveguides connected between the second input FPR and the second output FPR, the at least three waveguides being arranged, in a region immediately preceding the second output FPR, along rays emanating from a common center at the interface of the second output FPR with the first input FPR so as to focus light propagating in the at least three waveguides from the second input FPR to the second output FPR at a focus at the interface, and at least one heater laterally overlapping with the at least three waveguides, each of the heaters configured to impart an incremental phase shift between the light propagating in the at least three waveguides to thereby shift a lateral position of the focus.

42. A method comprising: tuning a wavelength response of an arrayed waveguide grating (AWG) with a beam sweeper comprising an input FPR, an output FPR adjoining and optically coupled to an input FPR of the AWG, at least three waveguides connected between the input FPR and the output FPR of the beam sweeper, and a pair of forward and backward heaters laterally overlapping with the at least three waveguides, the tuning comprising: focusing light propagating in the at least three waveguides from the input FPR of the beam sweeper to the output FPR of the beam sweeper at a focus at an interface between the output FPR of the beam sweeper and the input FPR of the AWG, and using one of the forward or backward heaters to impart an incremental phase shift between the light propagating in the at least three waveguides to thereby shift a lateral position of the focus, wherein the phase shift imparted by the forward heater is of an opposite sign than the phase shift imparted by the backward heater, whereby the forward heater and the backward heater shift the lateral position of the focus in mutually opposite directions.

43. A method comprising: tuning a wavelength response of an arrayed waveguide grating (AWG) with a beam sweeper comprising an input FPR, an output FPR adjoining and optically coupled to an input FPR of the AWG, at least three waveguides connected between the input FPR and the output FPR of the sweeper and arranged, in a region immediately preceding the output FPR of the beam sweeper, along rays emanating from a common center at the interface of the output FPR of the beam sweeper with the input FPR of the AWG, and at least one heater laterally overlapping with the at least three waveguides, the tuning comprising: focusing light propagating in the at least three waveguides from the input FPR of the beam sweeper to the output FPR of the beam sweeper at a focus at an interface between the output FPR of the beam sweeper and the input FPR of the AWG, and using the at least one heater, imparting an incremental phase shift between the light propagating in the at least three waveguides to thereby shift a lateral position of the focus.

44. A method comprising: in a photonic integrated circuit (PIC) comprising a silicon-on-insulator (SOI) substrate, an arrayed waveguide grating (AWG) formed at least partially within a silicon device layer of the SOI substrate, a pair of forward and backward heaters disposed at least partially within at least one of a cladding layer or the silicon device layer and laterally overlapping with the array of waveguides, and a back-etched region formed within the SOI substrate underneath the pair of heaters, altering a wavelength dispersion of the AWG by using one of the forward or backward heaters to impart an incremental heat-induced phase shift between adjacent waveguides of the AWG, the phase shift imparted by the forward heater being of an opposite sign than the phase shift imparted by the backward heater, wherein the back-etched region reduces dissipation of heat generated by the one of the forward or backward heaters in the SOI substrate.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This description, therefore, is not to be taken in a limiting sense, and the scope of various embodiments is defined only by the appended claims, along with the full range of equivalents to which such claims are entitled.

What is claimed is:

1. A system comprising:
   an arrayed waveguide grating (AWG) comprising a plurality of waveguides connected between a first input free propagation region (FPR) and a first output FPR; and
   a beam sweeper for tuning a wavelength response of the AWG, the beam sweeper comprising
      a second input FPR,
      a second output FPR adjoining and optically coupled to the first input FPR of the AWG,
      at least three waveguides connected between the second input FPR and the second output FPR, the at least three waveguides and the second output FPR being configured to focus light propagating in the at least three waveguides from the second input FPR to the second output FPR at a focus at an interface between the second output FPR and the first input FPR, and
      at least one pair of forward and backward heaters laterally overlapping with the at least three waveguides, each of the heaters configured to impart an incremental phase shift between the light propagating in the at least three waveguides to thereby shift a lateral position of the focus, the phase shift imparted by the forward heater being of an opposite sign than the phase shift imparted by the backward heater, whereby the forward heater and the backward heater shift the lateral position of the focus in mutually opposite directions.

2. The system of claim 1, wherein the at least three waveguides of the beam sweeper are fewer in number than the waveguides of the AWG.

3. The system of claim 1, wherein the at least three waveguides of the beam sweeper are arranged, in a region immediately preceding the second output FPR, along rays emanating from a common center at the interface of the second output FPR with the first input FPR.

4. The system of claim 3, wherein the plurality of waveguides of the AWG are arranged, in a region immediately following the first input FPR, along rays emanating from the center.

5. The system of claim 1, wherein the at least three waveguides of the beam sweeper are all equal in length.

6. The system of claim 1, wherein each of the heaters is configured to impart a constant incremental phase shift between all pairs of adjacent waveguides of the at least three waveguides.

7. The system of claim 6, wherein each of the heaters is configured to heat a heated region spatially overlapping the at least three waveguides to a substantially uniform temperature so as to impart a uniform phase shift per unit length of heated waveguide, the heated region being shaped and positioned such that heated waveguide portions increase, between all pairs of adjacent waveguides, by constant length increments.

8. The system of claim 7, wherein the at least three waveguides are uniformly spaced and the heated regions are triangular in shape.

9. The system of claim 6, wherein spacings between the at least three waveguides are selected based on a temperature distribution associated with the heaters to achieve the constant incremental phase shift.

10. The system of claim 1, wherein each of the heaters comprises a heating filament winding across an area laterally overlapping the at least three waveguides in a region to be heated.

11. The system of claim 10, wherein the heating filaments comprises segments of equal and constant width connected by metal connections.

12. The system of claim 1, comprising a plurality of pairs of heaters, each pair comprising a forward heater and a backward heater, at least some of the forward heaters or at least some of the backward heaters being configured to operate in parallel.

13. The system of claim 1, wherein the heaters laterally overlap with a section of the at least three waveguides in which the at least three waveguides all have a common curvature.

14. The system of claim 13, wherein the heaters laterally overlap with straight sections of the at least three waveguides.

15. The system of claim 1, wherein the AWG and the beam sweeper are implemented in a photonic integrated circuit comprising a silicon-on-insulator (SOI) substrate including a silicon handle, a buried oxide layer disposed on top of the silicon handle, a silicon device layer disposed on top of the buried oxide layer, and a cladding layer disposed on top of the silicon device layer.

16. The system of claim 15, further comprising a back-etched region in the silicon handle underneath the pair of heaters.

17. The system of claim 16, wherein the back-etched region has a constant width across the at least three waveguides.

18. The system of claim 15, further comprising thermal-isolation channels formed in at least one of the silicon device layer or the cladding layer surrounding heated portions of the at least three waveguides.

19. The system of claim 15, wherein the waveguides of the AWG and the sweeper are formed within the silicon device layer.

20. The system of claim 15, wherein the heaters comprise heating segments embedded in the cladding layer.

21. The system of claim 20, further comprising temperature-sensing elements embedded in the cladding layer in between the heating segments.

22. The system of claim 21, further comprising thermal isolation trenches in the cladding layer in between adjacent heating segments and temperature-sensing elements.

23. The system of claim 15, wherein the heaters comprise doped, resistive regions in the silicon device layer.

24. The system of claim 1, wherein the AWG is bidirectional, the system further comprising a second sweeper comprising
 a third input FPR,
 a third output FPR adjoining and optically coupled to the first output FPR of the AWG,
 at least three waveguides connected between the third input FPR and the third output FPR, the at least three waveguides and the third output FPR being configured to focus light propagating in the at least three waveguides from the third input FPR to the third output FPR at a focus at an interface between the third output FPR and the first output FPR, and
 at least one pair of forward and backward heaters laterally overlapping with the at least three waveguides, each of the heaters configured to impart an incremental phase shift between the light propagating in the at least three waveguides to thereby shift a lateral position of the focus, the phase shift imparted by the forward heater being of an opposite sign than the phase shift imparted by the backward heater, whereby the forward and backward heaters shift the lateral position of the focus in mutually opposite directions.

25. A system comprising:
 an arrayed waveguide grating (AWG) comprising a plurality of waveguides connected between a first input free propagation region (FPR) and a first output FPR; and
 a beam sweeper for tuning a wavelength response of the AWG, the beam sweeper comprising
  a second input FPR,
  a second output FPR adjoining and optically coupled to the first input FPR of the AWG,
  at least three waveguides connected between the second input FPR and the second output FPR, the at least three waveguides being arranged, in a region immediately preceding the second output FPR, along rays emanating from a common center point at the interface of the second output FPR with the first input FPR so as to focus light propagating in the at least three waveguides from the second input FPR to the second output FPR at a focus at the interface, and
  at least one heater laterally overlapping with the at least three waveguides, each of the heaters configured to impart an incremental phase shift between the light propagating in the at least three waveguides to thereby shift a lateral position of the focus.

26. A method comprising:
 tuning a wavelength response of an arrayed waveguide grating (AWG) with a beam sweeper comprising an input FPR, an output FPR adjoining and optically coupled to an input FPR of the AWG, at least three waveguides connected between the input FPR and the output FPR of the beam sweeper, and a pair of forward and backward heaters laterally overlapping with the at least three waveguides, the tuning comprising:
 focusing light propagating in the at least three waveguides from the input FPR of the beam sweeper to the output FPR of the beam sweeper at a focus at an interface between the output FPR of the beam sweeper and the input FPR of the AWG, and
 using one of the forward or backward heaters to impart an incremental phase shift between the light propagating in the at least three waveguides to thereby shift a lateral position of the focus,
 wherein the phase shift imparted by the forward heater is of an opposite sign than the phase shift imparted by the backward heater, whereby the forward heater and the backward heater shift the lateral position of the focus in mutually opposite directions.

* * * * *